United States Patent [19]

Schneider et al.

[11] Patent Number: 4,792,439
[45] Date of Patent: Dec. 20, 1988

[54] PROCESS FOR DECREASING THE CONTENT OF NITROGEN OXIDES IN FLUE GASES

[75] Inventors: Michael Schneider, Ottobrunn-Riemerling; Hans J. Wernicke, Geretsried; Karl Kochloefl, Bruckmühl/Heufeld; Gerd Maletz, Landshut, all of Fed. Rep. of Germany

[73] Assignee: Sud-Chemie Aktiengesellschaft, Munich, Fed. Rep. of Germany

[21] Appl. No.: 47,797

[22] Filed: May 7, 1987

Related U.S. Application Data

[62] Division of Ser. No. 895,404, Aug. 11, 1986.

[30] Foreign Application Priority Data

Aug. 13, 1985 [DE] Fed. Rep. of Germany ....... 3529060
Sep. 10, 1985 [DE] Fed. Rep. of Germany ....... 3532226

[51] Int. Cl.$^4$ .......................... B01J 8/00; C01B 21/00
[52] U.S. Cl. .................................................. 423/239
[58] Field of Search .............. 423/239, 239 A; 502/84

[56] References Cited

U.S. PATENT DOCUMENTS

| | | | |
|---|---|---|---|
| 3,962,135 | 6/1976 | Alafandi | 252/450 |
| 4,140,654 | 2/1979 | Yoshioka et al. | 423/239 |
| 4,176,091 | 11/1979 | Inaba et al. | 423/239 |
| 4,282,115 | 8/1981 | Atsukawa et al. | 423/239 |

FOREIGN PATENT DOCUMENTS

| | | | |
|---|---|---|---|
| 2748471 | 6/1973 | Fed. Rep. of Germany . | |
| 2458888 | 6/1975 | Fed. Rep. of Germany . | |
| 2410175 | 9/1975 | Fed. Rep. of Germany . | |
| 3438367 | 5/1985 | Fed. Rep. of Germany . | |
| 53-93193 | 8/1978 | Japan . | |
| 90187 | 8/1978 | Japan | 423/239 |
| 112274 | 9/1978 | Japan | 502/83 |
| 44029 | 4/1981 | Japan | 423/239 |
| 56-141837 | 11/1981 | Japan . | |

*Primary Examiner*—Gregory A. Heller
*Attorney, Agent, or Firm*—Sprung Horn Kramer & Woods

[57] ABSTRACT

A process for decreasing the content of nitrogen oxides in flue gases. The process comprising contacting the flue gases with a catalyst. The catalyst contains at least one of the metals titanium, zirconium, vanadium, tungsten, molybdenum, or cerium in the form of one or more of their oxides combined with a silicate with a layer structure (layer silicate) comprising acid-activated kaolin. The crystalline layer structure of the acid-activated kaolin is essentially retained, while being not yet X-ray amorphous. The acid activation increases the BET surface area at least 15% and preferably at least 50% in terms of the BET surface area of the kaolin before acid activation. The atomic ratio of the silicon in the acid-activated kaolin to the metal in the oxide is from 0.2 and 50 and preferably from 0.4 to 25.

17 Claims, No Drawings

PROCESS FOR DECREASING THE CONTENT OF NITROGEN OXIDES IN FLUE GASES

This is a division of application Ser. No. 895,404 filed Aug. 11, 1986 now pending.

BACKGROUND OF THE INVENTION

1. Field the Invention

The invention concerns a catalyst for decreasing the content of nitrogen oxides in flue gases.

2. Background Information

Nitrogen oxides ($NO_x$) are generated both from the nitrogenous constituents of the fuel and from the nitrogen in the air when fossil fuels are burned. The oxides enter the atmosphere and become extremely detrimental to the environment.

It is known that nitrogen oxides can be converted into $N_2$ and $H_2O$ by $NH_3$ and that the reaction is fairly selective over a wide range of temperatures, meaning that, since it proceeds in the presence of a high excess of oxygen (as is usual in flue gases) without excessive loss of ammonia as the result of oxidation, only relatively small amounts of reductants are necessary. Various catalysts for reducing $NO_x$ with ammonia are also known.

German AS No. 2 410 175, for example, discloses catalysts of this type that consist of oxides of vanadium molybdenum, and/or tungsten. the stoichiometry is $V_{12-x-y}Mo_xW_y$, wherein $0 \leq x \leq 8.0 \leq y \leq 5$ and $0.3 \leq (x+y) \leq 8$.

Furthermore, German patent 2 458 888 discloses a method of reductively decomposing nitrogen oxides in flue gases. A mixture of gases containing nitrogen oxides, molecular oxygen, and ammonia is contacted with a catalyst composition that contains (A) titanium in the form of oxides in an intimate mixture with (B) iron or vanadium in the form of oxides as its essential constituents.

The drawback to these catalysts is that the catalytically active constituents that they contain in the form of relatively expensive transition metals are exploited only to a low degree because they are not optimally distributed. Although the active constituents are extended by solid inert carriers, which does make them more economical, the dilution with inert material entails the risk of extensively decreasing their catalytic activity. Another drawback to these catalysts is that they also catalyze the $SO_2$ that is often contained in the flue gas into $SO_3$, which can lead for example to deposits of salts in the downstream equipment of the system.

German OS No. 3 438 367 also discloses a catalyst for decreasing the content of nitrogen oxide in flue gases by selective reduction. The catalyst consists of (A) 80 to 95% by weight of a catalytic oxide containing a sulfur oxide and is obtainable among other methods by heat treating an aqueous oxide compound of titanium or silicon, (B) 0 to 5% by weight of a catalytic oxide that contains vanadium oxide, and (C) 1 to 15% by weight of a catalytic oxide like tungsten oxide.

Considered essential to this catalyst is the formation of a solid acid composed of $SiO_2$ and $TiO_2$, its acidity modified by treatment with sulfuric acid or ammonium sulfate. The distribution of the solid acid is considered as representing the standard for controlling the adsorption of $NH_3$ at the surface of the catalyst and hence for improving its catalytic activity.

The $SiO_2$ is employed in the form of a silica sol. It is known that silica gels distinguished both by high BET surfaces and by high porosity can be obtained from $SiO_2$ sols, although the percentage of macropores is low, which has a deleterious effect on material transport and hence on catalytic activity.

German OS No. 2 748 471, finally, discloses a catalyst composition to be employed in the vapor-phase reduction of nitrogen oxides with ammonia, especially to reduce the content of nitrogen oxides in flue gases. This catalyst consists essentially of an oxide or sulfate of one of the metals copper, vanadium, chromium, molybdenum, tungsten, manganese, iron, or cerium on a shaped carrier that contains titanium oxide and a minor portion of a clay mineral with a mean particle size of 0.1 to 100 $\mu$m. Clay minerals, inter alia, of the kaolin type, can be employed. These are silicates with a two-layer structure. Up to 15% by weight of these clay minerals is claimed to increase only the stability of the catalyst. The additives have no significant effect on catalytic activity at these levels and larger amounts even have a negative effect in this respect. Due to their chemical composition, they also decrease the catalyst's resistance to flue gases that contain $SO_x$.

SUMMARY OF THE INVENTION

It has been discovered that specifically modified kaolin that interacts synergistically with other catalytic constituents can be employed to obtain catalysts of the aforesaid genus with improved activity. The latter catalysts can be employed in turn to extensively decrease the content of nitrogen oxide in flue gases, while simultaneously exploiting both the expensive oxidic constituents of the catalyst and the reductants and increasing its resistance to $SO_x$.

The object of the invention is accordingly to provide a catalyst for decreasing the content of nitrogen oxides in flue gases and containing at least one of the metals titanium, zirconium, vanadium, tungsten, molybdenum, or cerium in the form of one or more of their oxides combined with a silicate with a layer structure (layer silicate).

The catalyst is characterized in that (a) the layer silicate is or comprises an acid-activated but not yet X-ray-amorphous kaolin whose crystalline layer structure is partly retained, (b) the acid activation increases the BET surface area at least 15% and preferably at least 50% as compared to the BET surface area of the kaolin before acid activation, and (d) the atomic ratio of the silicon in the acid-activated kaolin to the metal(s) in the oxide(s) is from 0.2 and 50 and preferably from 0.4 to 25.

DETAILED DESCRIPTION OF THE INVENTION

"Acid activation" of the kaolin to be understood in accordance with the invention as a treatment by which the aluminum is partly removed from the lattice of the layer silicate.

Acid activation of the kaolin most likely leads to the silicate layers being attacked from the edges and the ions being released from the octahedral layers. The the remaining $SiO_4$ tetrahedral bands have a certain wedge action and steric hindrance, especially during drying, that disorients the layers, although the crystalline layer structure is essentially maintained. The result is a state intermediate between the crystalline structure of the kaolin, either the original or the one already in the H form, and the completely destroyed crystalline structure of amorphous silicic acid.

Acid activation increases the specific surface area which is generally determined by the BE method. An appropriately high specific surface area remains even after the acid-activated kaolin has been intimately mixed with the oxidic constituents of the catalyst, even when large amounts of them have been employed. Acid activation must not on the other hand be continued until only amorphous silicic acid remains because the synergistic interaction with the oxidic constituents of the catalyst will obviously cease at that point, as will be evident from a steep drop in catalytic activity at an increased content of silicic acid.

The acid-activated kaolin enters into synergistic interaction with the metal oxides. Although no unambiguous mechanistic explanation of this synergism can be provided at the present, reorientation of the silicate layer structure by the acid activation would seem to be a prerequisite. Conversion with, for instance, a silica gel with a similar BET surface instead of the acid-activated silicates in accordance with the invention in conjunction with the oxidic metal constituents will result in a definitely lower catalytic activity.

The specific surface area of the acid-activated kaolin employed in accordance with the invention is preferably between about 5 and 100 m$^2$/g.

The acidic decomposition is carried out until the SiO$_2$ content of the acid-activated kaolin is at least 5% and preferably at least 10% higher than that of the starting material. Depending on the starting material, the SiO$_2$ content will then be 45 to 90% and preferably 50 to 65% by weight. Acidic decomposition is, however, not continued until only X-ray amorphous SiO$_2$ remains. It is discontinued at a specific degree of crystallinity on the part of the acid-activated layer silicate i.e. when no more than 45% extractable silicate is present. The percentage of extractable silicate is determined by washing and drying the filter cake obtained in carrying out the acidic decomposition and treating it with a soda solution as described by Y. Otsubo, *Jap. J. Chem.*, 72, 573 (1951).

Macropores with a diameter of more than 80 nm will preferably account for at least 25% of the total volume of pores. Pore volume is determined by mercury porosimetry.

The starting materials that contain the kaolin can be acid activated in a way that is in itself known, preferably with aqueous mineral acids like hydrochloric or sulfuric acid. Organic acids like formic and acetic acid can, however, also be employed. The acid is employed in a concentration, of from 1 to 60% by weight in terms of the solids content and preferably in the range of 10 to 40% by weight. Preliminary wet classification of the raw material can be practical. The acid-treated composition is washed with, if necessary, acidified water and filtered out.

The catalysts in accordance with the invention are also outstanding in their resistance to sulfur oxides and sulfuric acid as dictated by acid activation of kaolin. It has been confirmed that catalysts prepared with untreated starting silicates are especially sensitive to sulfur oxides or sulfuric acid, leading to mechanical destruction and premature aging of the catalyst.

Although, on the other hand, catalysts manufactured with amorphous silicic acid are resistant to sulfur oxides and sulfuric acid, their NO$_x$ activity is definitely poor.

The starting compounds employed for the metaloxide constituents of the catalyst in accordance with the invention are on the one hand the corresponding metal oxides and on the other the substances that can be converted into the metal oxides, e.g. the metals and hydroxides and especially salts, complex compounds, and/or oxygen acids or salts derived from the last. They can be employed if necessary in conjunction with an additive that functions as a reductant and/or complexing agent.

Cerium can for example be employed in the form of Ce$_2$O$_3$, CeO$_2$, Ce(SO$_4$)$_2$, and Ce$_2$(C$_2$O$_4$)$_3$. Appropriate starting materials for zirconium oxide are, in addition to the oxide hydrates, for example, the zirconium and zirconyl salts like Zr(SO$_4$)$_2$, ZrCl$_4$, ZrOCl$_2$, and Zr(C$_2$O$_4$)$_2$.

Appropriate starting substances for the tungsten constitutents are, for example, tungsten oxides like WO$_3$, W$_{10}$O$_{29}$, W$_4$O$_{11}$, and WO$_2$ and mono- and polytungstic acids, heteropolyacids, tungstates, and tungstic halides and oxyhalides. Molybdenum compounds can also be employed instead of the analogous tungsten compounds.

Appropriate vanadium starting compounds include V$_2$O$_5$, VO$_2$, V$_2$O$_3$, and VO along with ortho- and polyvanadic acids or vanadates, vanadium halides and oxyhalides like VOCl$_3$, for example, and various vanadium or vanadyl salts.

Appropriate titanium compounds are, in addition to the oxides and oxide hydrates, the titanium and titanyl salts, especially the halides and sulfates. Although titanyl sulfate is preferable from the economic point of view, metal-organic compounds like titanates, isopropyl titanate for example, can also be employed.

It has been discovered that expecially practical results can be achieved when the metal oxides are individually present in the following ranges of concentration (by weight):

| | |
|---|---|
| TiO$_2$ = | 10–80 wt. % |
| WO$_3$ and/or MoO$_3$ = | 1–25 wt. % |
| V$_2$O$_5$ = | 0,1–25 wt. % |
| CeO$_2$ = | 1–25 wt. % | with the acid-activated kaolin accounting for the rest of the active constituents.

The metal oxides are present in the preferred catalysts in a binary, especially ternary combination.

When present in a ternary combination, the metal oxides are, present in a preferred catalyst in one of the following percentages by weight:

| | |
|---|---|
| (a) (TiO$_2$ + WO$_3$ and/or MoO$_3$ + V$_2$O$_5$) = | 10–80 |
| (b) (TiO$_2$ + CeO$_2$ + V$_2$O$_5$) = | 10–80 |
| (c) (TiO$_2$ + ZrO$_2$ + V$_2$O$_5$) = | 10–80 |
| (d) (WO$_3$ and/or MoO$_3$ + CeO$_2$ + V$_2$O$_5$) = | 10–25 |
| (e) (WO$_3$ and/or MoO$_3$ + ZrO$_2$ + V$_2$O$_5$) = | 10–25 | with the acid-activated kaolin accounting for the rest of the active constituents.

The ratios between the weights of the metal oxides present in a ternary combination in a preferred catalyst are as follows:

| | |
|---|---|
| (a) $WO_3$ and/or $MoO_3:TiO_2 =$ | 0.01–0.25 |
| $V_2O_5:TiO_2 =$ | 0.01–0.11 |
| (b) $CeO_2:TiO_2 =$ | 0.05–0.23 |
| $V_2O_5:TiO_2 =$ | 0.01–0.11 |
| (c) $ZrO_2:TiO_2 =$ | 0.01–0.24 |
| $V_2O_5:TiO_2 =$ | 0.01–0.11 |
| (d) $CeO_2:WO_3$ and/or $MoO_3 =$ | 0.1–5.0 |
| $V_2O_5:WO_3$ and/or $MoO_3 =$ | 0.1–2.5 |
| (e) $V_2O_5:WO_3$ and/or $MoO_3 =$ | 0.1–2.5 |
| $ZrO_2:WO_3$ and/or $MoO_3 =$ | 0.1–10 |

The catalysts in accordance with the invention can be obtained, for example, by impregnating the acid-activated kaolin with a solution containing one or more of the aforesaid metals in the form of salts and/or complex compounds and calcining it.

In another variant, the catalyst can be obtained by mechanically mixing the acid-activated kaolin with an oxide or salt of one or more of the aforesaid metals (by grinding in a ball mill for example), impregnating the mixture, if necessary, with a solution containing one or more of the aforesaid metals in the form of salts and/or complex compounds, and calcining it.

The catalysts in accordance with the invention can also be obtained by precipitating or reprecipitating at least one compound containing one or more of the aforesaid metals in the presence of a suspension of the acid-activated kaolin washing out the foreign ions, and calcining.

The compound or compounds containing one or more of the aforesaid metals can also be precipitated or reprecipitated in the presence of a mixture of suspensions of the acid-activated kaolin and of an oxide or salt of one or more of the aforesaid metals. This stage is followed by washing out the foreign ions and calcining.

The result of these procedures is an almost optimally intimate mixture of the oxidic metal constituents with the acid-activated kaolin.

If the oxidic metal constituents consist of several metal oxides, the particular starting compounds can either be precipitated together or one after another in several stages, with the sequence of precipitation stages generally affecting the catalytic activity and needing to be optimized individually. It can of course turn out to be practical to impregnate the acid-activated kaolin, subsequent to one or more precipitaton stages, if necesssary, with a solution of a corresponding transition compound. Impregation can occur either before or after shaping and calcining the catalyst.

The catalyst in accordance with the invention can also contain an inert carrier. The catalyst is usually present in the from of molded shapes, expecially balls, tablets, extruded shapes, oblong or flat honeycombs, (called "channel grids") plates, rods, tubes, rings, wagon wheels, or saddles.

The shapes can be obtained for example by tableting or extruding the catalyst composition, with additives also mixed in, if necessary, to facilitate shaping. Such additives include, for example, graphite and aluminum stearate. Additives to improve the surface structure can also be mixed in. These include, for example, organic substances that will burn up and leave a porous structure during the subsequent calcination.

It is not absolutely necessary to employ additives to facilitate shaping because the starting material is plastically deformable even when intimately mixed with the metal constituents. Neutral bentonites or other binders like untreated kaolin or cement can, however, also be added. The material is generally shaped with water or organic solvents like monovalent or polyvalent alcohols added.

The catalysts in accordance with the invention are usually dried after being shaped, and calcined at temperatures of 200° C. to 700° C. and preferably 300° C. to 550° C. Inorganic fibrous materials can also be added before shaping to improve strength. Calcination activates the catalyst, which accordingly obtains its practical properties, expecially if the aforesaid temperature ranges are maintained.

The examples hereinbelow specify typical procedures for manufacturing the catalysts in accordance with the invention.

Another object of the invention is the use of the catalysts in accordance with the invention for reductively decreasing the content of nitrogen oxide in flue gases that contain, in addition to the usual constituents, sulfur oxides ($SO_x$), whereby $NH_3$ is employed as a reductant.

In reducing with $NH_3$, the content of nitrogen oxides in the flue gases is decreased due to the formation of $N_2$ and $H_2O$. Although nitrogen oxides ($NO_x$) are any compound of nitrogen and oxygen like $NO$, $N_2O_3$, $NO_2$, and $N_2O_5$, the most important in the present context are $NO$ and $NO_2$, mainly the former.

The concentration of $NO_x$ in the flue gases that are to be cleaned can vary widely, generally ranging from 100 ppm by volume to 5% by volume. The molar ratio of $NH_3$ to $NO_x$ is generally 0.3 to 3, preferably 0.6 to 1.5, and can be regulated by controls technology to obtain maximum $NO_x$ conversion at the minimum possible $NH_3$ slippage. The $NH_3$ can be added either in the form of a gas or in aqueous solution.

The catalysts in accordance with the invention are distinguished beyond known catalysts by a very extensively selective conversion of the ammonia that is preferred for reducing the nitrogen oxides. In conventional methods, expecially at high operating temperatures, a considerable amount of the ammonia does not get consumed during the desired $NO_x$ removal, but oxidizes due to the oxygen present in the flue gas. This leads to additional nitrogen formation or decreases the conversion of $NO_x$ observed between the entrance into and exit from the reactor, leading to unnecessary consumption of $NH_3$.

Any of the reactors employed for heterogeneous catalyzed gas-phase reactions are appropriate for the $NO_x$ reduction if their design allows high volumetric flue-gas currents in relation to output. Permissible space velocities are in the range of 500 to 20,000 and preferably 1000 and 15,000 liters of gas per hour and liters of catalyst in terms of a gas to 0° C. and 1 bar. Space velocity will be designated as the dimension $h^{-1}$ in what follows for the sake of simplicity. Appropriate reaction temperatures range from approximately 200° C. to 600° C. and preferably 250° to 430° C. If the temperatures are much higher the ammonia can be oxidized by the oxygen in the flue gas, removing the ammonia from the reaction along with the nitrogen oxides and allowing the degree of $NO_x$ reduction to drop. This undesirable effect, however, is not as powerful with the catalysts in accordance with the invention as with known catalysts.

Typical examples of the manufacture and use of the catalysts in accordance with the invention will now be specified.

The effectiveness of the catalysts with respect to eliminating nitrogen oxides from mixtures of gases that contain, among other substances, oxygen and sulfur oxides is determined by contacting the catalyst with a stream of gas flowing through a tube packed with the catalyst and electrically heated from outside. The mixture of gases is composed of:
$O_2$ 3% by volume
$H_2O$ 10 by volume
NO 750 ppm by volume
$NO_2$ 50 ppm by volume
$NH_3$ 800 ppm by volume
$SO_2$ 950 ppm by volume
$SO_3$ 50 ppm by volume and
$N_2$ to make up 100% by volume.

The concentration of $NO_x$ in the mixture was measured before and after it traveled through the catalyst packing by an apropriated analyzer (chemoluminescence). The level of $NO_x$ converted subsequent to establishment of a stationary state and as defined by the equation $$NO_x \text{ conversion } (C_{NOx}) = \frac{c^E_{NOx} - c^A_{NOx}}{c^E_{NOx}} \cdot 100\ (\%)$$

was selected as the measure for the effectiveness of the catalysts in reducing the nitrogen oxides. $c_{NOx}$ represents the concentrations of NO and $NO_2$, and the superscripts E and A the state of the mixture of gases before and after traveling through the catalyst.

EXAMPLE 1

(a) 2 kg of a kaolin (SPS china clay) with a BET surface area of 11 $m^2/g$, and the chemical composition listed in Table I, are stirred into 8 liters of an aqueous solution of HCl for 6 hours at 80° C. The HCl level is about 22% by weight of the dry substance. The material is suctioned off and the filter cake thoroghly washed with acidified water (pH adjusted to 3.5 with HCl). The resulting acid-activated kaolin ("AAK" hereinafter) after drying at 200° has a BET surface area of 24 $m^2/g$. Its chemical composition is also listed in Table I.

(b) 720 g $TiOSO_4$ is stirred into a suspension of 400 g AAK as obtained in step (a). The batch is neutralized with ammonia. The solids are suctioned-off, washed free of sulfates, dried for 15 hours at 120° C., and kneaded into a solution of 41.9 g ammoniummetatungstate in water and into a solution obtained by reducing 5.2 g ammonium metavanadate with a 1.6-fold excess of oxalic-acid dihydrate. The amounts of solvents were selected to ensure easy-to-knead pastes. The percentage of the pore volume occupied by macropores with a diameter larger than 80 nm as determined by Hg porosimetry was 87.4%.

EXAMPLE 2

400 g of the kaolin used as starting material in Example 1 are charged with titanyl sulfate, ammonium metatungstate and ammonium metavanadate, following the procedure of Example 1, step (b).

The composition of the catalysts, the reaction temperatures and the $NO_x$ conversions at a space velocity of 5000 $h^{-1}$ are listed in Table II. The above-mentioned gas mixture was used for carrying out the reactions; the $NO_x$ conversions were calculated according to the above-mentioned formula.

TABLE I

| | Composition of the silicates | | | | | | | |
|---|---|---|---|---|---|---|---|---|
| Silicate | $SiO_2$ (%) | $Al_2O_3$ (%) | $Fe_2O_3$ (%) | CaO (%) | MgO (%) | $Na_2O$ (%) | $K_2O$ (%) | Ignition loss (%) |
| AAK* from Example 1 | 62.3 | 29.6 | 0.5 | <0.1 | 0.2 | 0.1 | 1.3 | 5.4 |
| Crude kaolin from Example 2 | 47.6 | 36.4 | 0.5 | 0.1 | 0.2 | 0.1 | 1.3 | 12.7 |

*Acid-activated kaolin

TABLE II

| | Composition of the catalysts and $NO_x$ conversions | | | | | | | |
|---|---|---|---|---|---|---|---|---|
| | | $V_2O_5$ | $WO_3$ | $TiO_2$ | $NO_x$ | conversion | | |
| Example | Silicate constituent | (%) | (%) | (%) | 250° C. | 300° C. | 350° C. | 400° C. |
| 1 | Acid-activated kaolin | 50 | 0.5 | 4.5 | 45 | 91 | 92 | 89 | 81 |
| 2 | Crude kaolin | 50 | 0.5 | 4.5 | 45 | 90 | 90 | 83 | 67 |

What is claimed is:

1. A process for reductively decreasing the content of nitrogen oxide in flue gases that contain sulfur oxides, the process comprising contacting the flue gases with a catalyst and with $NH_3$, which is employed as a reductant, said catalyst comprising at least one metal selected from the group consisting of titanium, zirconium, vanadium, tungsten, molybdenum and cerium in the form of one or more of their oxides and a silicate with a layer structure comprising acid-activated, but not yet X-ray amorphous kaolin whose crystalline layer structure is partly retained, the acid activation increasing the BET surface area at least 15% in terms of the BET surface area of the kaolin before acid activation, and the atomic ratio of the silicon in the acid-activated kaolin to the metal in the oxide being between 0.2 to 50, wherein the process is conducted at a temperature of 350° C. to 600° C., wherein the metal in the catalyst is present in an amount of 0.1 to 80% by weight, with the acid-activated kaolin accounting for the rest of the catalyst weight.

2. A process according to claim 1, wherein the increase of the BET surface area is at least 50% of the BET surface area of the kaolin before acid activation.

3. A process according to claim 1, wherein the atomic ratio of the silicon in the acid-activated kaolin silicate to the metal in the oxide is from 0.4 to 25.

4. A process according to claim 1, wherein the $SiO_2$ content of the acid-activated layer silicate is at least 5% higher than that of the starting material.

5. A process according to claim 1, wherein the $SiO_2$ content of the acid-activated layer silicate is at least 10% higher than that of the starting material.

6. A process according to claim 1, wherein macropores with a diameter of more than 80 nm account for at least 25% of the total volume of pores of the catalyst.

7. A process according to claim 1, wherein the metal oxides are individually present in the following ranges of concentration:

| | |
|---|---|
| $TiO_2$: | 10–80% by weight, |
| $WO_3$ and/or $MoO_3$: | 1–25% by weight, |
| $V_2O_5$: | 0.1–25% by weight, and |
| $CeO_2$: | 1–25% by weight, | with the acid-activated kaolin accounting for the rest of the active constituents.

8. A process according to claim 1, wherein when present in a ternary combination, the metal oxides are present in one of the following percentages by weight:

| | |
|---|---|
| (a) $(TiO_2 + WO_3 +$ and/or $MoO_3 + V_2O_5) =$ | 10–80 |
| (b) $(TiO_2 + CeO_2 + V_2O_5) =$ | 10–80 |
| (c) $(TiO_2 + ZrO_2 + V_2O_5) =$ | 10–80 |
| (d) $(WO_3$ and/or $MoO_3 + CeO_2 + V_2O_5) =$ | 10–25 |
| (e) $(WO_3$ and/or $MoO_3 + ZrO_2 + V_2O_5) =$ | 10–25 | with the acid-activated kaolin accounting for the rest of the active constituents.

9. A process according to claim 8, wherein the ratios between the weights of the metal oxides present in the ternary combination are

| | |
|---|---|
| (a) $WO_3$ and/or $MoO_3:TiO_2 =$ | 0.01–0.25 |
| $V_2O_5:TiO_2 =$ | 0.01–0.11 |
| (b) $CeO_2:TiO_2 =$ | 0.05–0.23 |
| $V_2O_5:TiO_2 =$ | 0.01–0.11 |
| (c) $ZrO_2:TiO_2 =$ | 0.01–0.24 |
| $V_2O_5:TiO_2 =$ | 0.01–0.11 |
| (d) $CeO_2:WO_3$ and/or $MoO_3 =$ | 0.1–5.0 |
| $V_2O_5:WO_3 =$ | 0.1–2.5 |
| and | |
| (e) $V_2O_5:WO_3$ and/or $MoO_3 =$ | 0.1–2.5 |
| $ZrO_2:WO_3 =$ | 0.1–10 |

10. A process according to claim 1, wherein the catalyst is in the form of shaped bodies, oblong or flat honeycomb, plates, rods, tubes, rings, wagon wheels or saddles.

11. A process according to claim 1, wherein the catalyst is produced by impregnating the acid-activated kaolin with a solution containing one or more of the metals in the form of salts and/or complex compounds and conducting calcination.

12. A process according to claim 1, wherein the catalyst is produced by mechanically mixing the acid-activated kaolin with an oxide or salt of one or more of the metals, impregnating the resultant mixture with a solution containing one or more of the metals in the form of salts and/or complex compounds, and conducting calcination.

13. A process according to claim 1, wherein the catalyst is produced by precipitating or reprecipitating at least one compound containing one or more of the metals in the presence of a suspension of the acid-activated kaolin, washing out the foreign ions, and calcining.

14. A process according to claim 1, wherein the catalyst is produced by precipitating or reprecipitating at least one compound containing one or more of the metals in the presence of a mixture of suspensions of the acid-activated kaolin and of an oxide or salt of one or more of the metals, washing out the foreign ions, and calcining.

15. A process according to claim 1, wherein the process is conducted with space velocities in the range of 500 to 20,000 liters of gas per hour.

16. A process according to claim 1, wherein the temperature is 350° C. to 430° C.

17. A process according to claim 15, wherein the space velocity is 100 to 15,000 liters of gas per hour.

* * * * *